Sept. 12, 1933. E. T. FRANZEN ET AL 1,926,521
INSPECTION DEVICE FOR MOTION PICTURE FILM
Filed Dec. 16, 1930
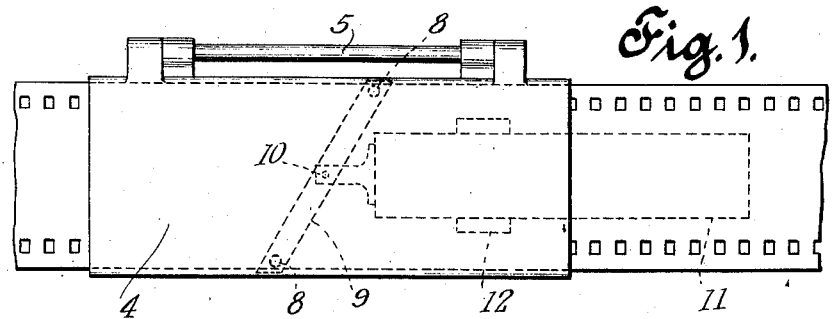
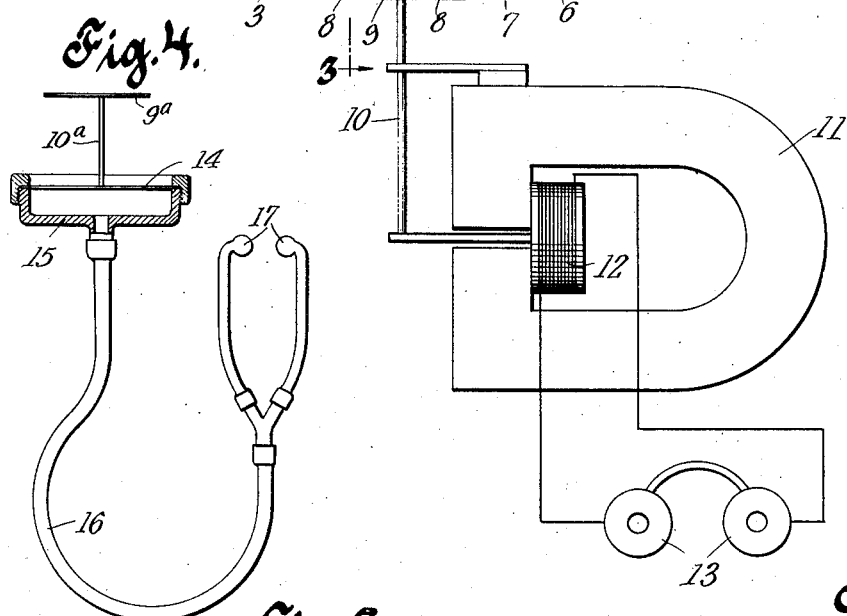
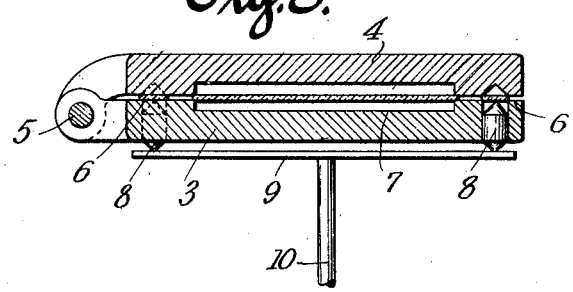
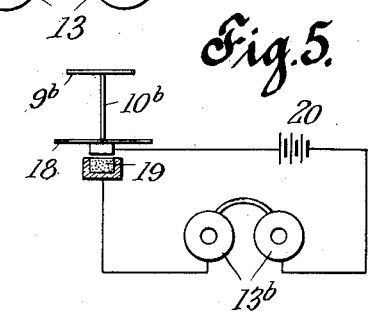
INVENTORS
Eric T. Franzen
Arthur C. J. Weiss
BY Fred C. Fischer
ATTORNEY Patented Sept. 12, 1933

1,926,521

UNITED STATES PATENT OFFICE 1,926,521

INSPECTION DEVICE FOR MOTION PICTURE FILM

Eric T. Franzen, Maplewood Township, Essex County, and Arthur J. Weiss, West Orange, N. J., assignors to Franklin Williams, Inc., Orange, N. J., a corporation of New Jersey Application December 16, 1930
Serial No. 502,706

3 Claims. (Cl. 177—311)

This invention relates to devices for inspecting motion picture films for tears and breaks.

Heretofore, in the inspecting of motion picture film for tears and breaks, it has been the practice for an operator to allow the film to pass between his fingers, the sensitivity of the fingers being relied upon to detect defects in the film.

Such a method is objectionable in that it is very taxing upon the fingers of the operator, and too much reliance is placed upon the sensitivity of the human element.

There are also automatic devices for detecting breaks, such devices usually comprising means for controlling a switch to discontinue the moving of a film upon the detection of a break.

However, the automatic devices are objectionable in that switch controlling mechanism is not reliable, requiring frequent and careful adjustment, and the film is not stopped instantly, necessitating in many cases that the film be unwound back from a reel to the section having the break.

It is an object of this invention to provide an inspection device for film by means of which breaks are indicated audibly to an operator.

A further object is the provision of electrical means for indicating breaks in films.

A further object is the provision of means for producing a sensible signal to indicate irregularities in surfaces required to be smooth.

A further object is the provision of means for producing an electrical current when a break occurs in a motion picture film being inspected.

These and other advantageous objects, which will later appear, are accomplished by the simple and practical construction and arrangement of parts hereinafter described and exhibited in the accompanying drawing, forming part hereof, and in which:

Figure 1 represents a plan view of the device.
Figure 2 represents a side view of the device.
Figure 3 represents a sectional view of the device taken on line 3—3 of Figure 2.
Figure 4 represents a modified form of the inspecting device in which a sensible signal is produced by variation in a column of gas or liquid.
Figure 5 shows a further modification in which a signal is produced by varying the flow of current in an electrical circuit of the telephone transmitter type.

Referring to the drawing, the inspection device is shown to include a plate 3 having a cover member 4 hinged thereto at 5. The plate 3 has spaced runways 6 and a central recess 7. Freely positioned in apertures in the runways 6 are plugs 8 having conical heads which project above and below the plate 3, and rest on a resilient cross bar 9 attached to the stylus 10 of a magnetic unit 11 such as a commonly used in sound reproducing devices.

The stylus passes between the poles or arms of a magnet and through a small coil so that movement of the stylus will cause a current to be generated in the small coil 12 of the reproducing unit.

Ear phones 13 may be attached to the terminals of the coil 12 or instead of the ear phones, the coil may be connected to an amplifying device and then to other signalling means, or to a light sensitive cell, or means for indicating movement of the stylus.

In operation, a motion picture film is passed over the plate 3, the edges of the film resting on the runways 6, and the recess 7 preventing the frames of the film from being scratched by contact with roughened surfaces as it passes through the inspection device.

As long as there are no irregularities in the film, the pressure on the plugs is uniform and consequently there will be no movement of the stylus.

But, when an irregularity in the film such as a break or patch passes over the plugs 8, the pressure is changed and the resilient cross bar 9 will be moved to move the stylus and cause a current to be generated in the coil 12.

The cross bar 9 is shown diagonally arranged with reference to the runways 6. The purpose of this arrangement is to enable an operator to distinguish between a patch in the film and a break. When a patch occurs, the operator will hear two sounds in succession in the ear phones; while with a break, only one sound will be heard.

While the device has been described as employing a magnetic unit, it is obvious that other types of reproducing units may be used, such as the dynamic, electromagnetic and telephone transmitter types.

In the modified form shown in Figure 4, the film passes over members similar to the plugs 8, which members are in engagement with a resilient strip 9a connected by a rod 10a to a diaphragm 14, covering a chamber 15, the latter being connected by a tube 16 to members 17 shaped for insertion in the ears.

Any disturbance of the strip 9a will cause a similar disturbance of the diaphragm 14 and the gas or liquid column in the tube 16, and the disturbance will be readily noted by a person having the members 17 in his ears in the same manner as a physician employs a stethoscope for inspecting the human body.

In the modified form shown in Figure 5, a resilient strip $9b$ is connected by a rod $10b$ to a diaphragm 18 which engages carbon granules 19 in a circuit including a battery 20 and ear phones $13b$. The arrangement being similar to that of the well known telephone transmitter.

Obviously, whenever a break in a film varies the pressure of the film on the strip $9b$, the disturbance will be transmitted to the carbon granules, and change the resistance of the circuit, and the current flowing therethrough, and such changes will be readily indicated by the ear phones $13b$.

From the above description, it will be seen that I have provided effective means for instantly indicating breaks in a film to an operator by a sensible signal. The device includes no resilient switch closing fingers which become unreliable after being used for a while, nor is it necessary to furnish electrical current for the device, as in the form shown in Figure 1, the effect of a break in a film is to produce a minute electrical current which is readily noted by the ear phones. This same electrical current may be amplified and serve as initial means for putting in operation devices to instantly stop movement of the film.

Also, the device is not confined to the inspection of motion picture film, but may be employed in any situation where it is desired to detect irregularities in surfaces.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described our invention, what we claim as new and desire to secure by Letters Patent, is:

1. In a device for detecting breaks in motion picture film, a plate having apertures, a pair of plugs over which the film passes, said plugs being in the apertures and projecting above and below the plate, a resilient bar bearing against the plugs below the plate, a stylus attached to the bar, and means associated with the stylus to produce a sound when a break in the film causes the plugs to bear unevenly on the bar.

2. In a device for detecting breaks in motion picture film, a pair of spaced plugs over which the film passes, a resilient bar bearing against the plugs, and means connected to the bar to generate an electrical current when a break in the film causes the plugs to bear unevenly on the bar.

3. In a device for detecting breaks in motion picture film, a pair of spaced plugs over which the film passes, a resilient bar bearing against the plugs, said bar being oblique to the path of the film, and means connected to the bar to generate an electrical current when a break in the film causes the plugs to bear unevenly on the bar.

ERIC T. FRANZEN.
ARTHUR J. WEISS.